3,410,059
APPARATUS FOR TESTING THE
RADIOACTIVITY OF AIR
André Garnier, Saint Remy-les-Chevreuse, France, assignor to Societe Siersatom, Paris, France
Filed Feb. 20, 1967, Ser. No. 617,192
Claims priority, application France, Apr. 8, 1966, 57,146
5 Claims. (Cl. 55—270)

ABSTRACT OF THE DISCLOSURE

An apparatus for sampling aerosols, especially for sampling air which is contaminated by radioactive particles, and comprising a closed case connected to a filter by means of a flexible hose, an electric motor and a separate supply battery, a piston coupled to said motor by means of a transmission unit whereby said piston is driven in reciprocating translational motion within a cylinder which is rigidly fixed to said case, two flexible membranes defining within said cylinder two cavities having a volume which is variable in inverse ratio, valves for the admission and discharge of contaminated air into and from each of said cavities and an opening for discharging air from said case.

The present invention relates to a personal apparatus of portable design for the purpose of sampling aerosols and taking measurements of atmospheric contamination. The apparatus is primarily intended for the use of persons working in hot cells or shielded caves and engaged in the handling of radioactive materials.

A number of different types of equipment are already in existence for the purpose of sampling given quantities of contaminated air with a view to permitting an assessment of the radiation hazards to which workers are exposed in radioactive areas. However, these devices make it possible to sample only relatively small volumes, especially by comparison with the quantity of air which is actually inhaled by an individual during the time he remains in a dangerous atmosphere. Under such conditions, the data supplied by devices of this type cannot be extrapolated with a sufficient degree of accuracy to permit determination of the exact dose of ionizing radiation actually received.

This invention is directed to an individual and portable apparatus which makes it possible to overcome the disadvantages referred to, said apparatus being capable of monitoring a volume of contaminated air in a proportion which is very close to the quantity actually inhaled by the wearer of this apparatus.

To this end, the invention is characterized in that it comprises a closed case connected by means of a pipe to a filter for retaining radioactive particles, an electric motor and a separate supply battery disposed inside said case, a piston coupled to said motor by means of a transmission unit which converts the movement of rotation of the motor shaft to a reciprocal translational displacement of said piston within a cylinder which is rigidly fixed to said case, two flexible membranes attached to the ends of said piston so as to form inside said cylinder two cavities having a volume which varies in inverse ratio, a passageway providing a communication between said pipe and said cylinder, valves for the admission and discharge of contaminated air into and from each of said cavities and an opening for discharging air from said case.

In addition to this main feature, a sampling apparatus as constructed in accordance with the invention is characterized by a number of secondary features which will be referred to in greater detail hereinafter. All of these features which are preferably employed at the same time but which can if necessary be employed independently will become apparent from the following description of one example of construction which is given by way of indication and not in any limiting sense.

Figures 1, 2:
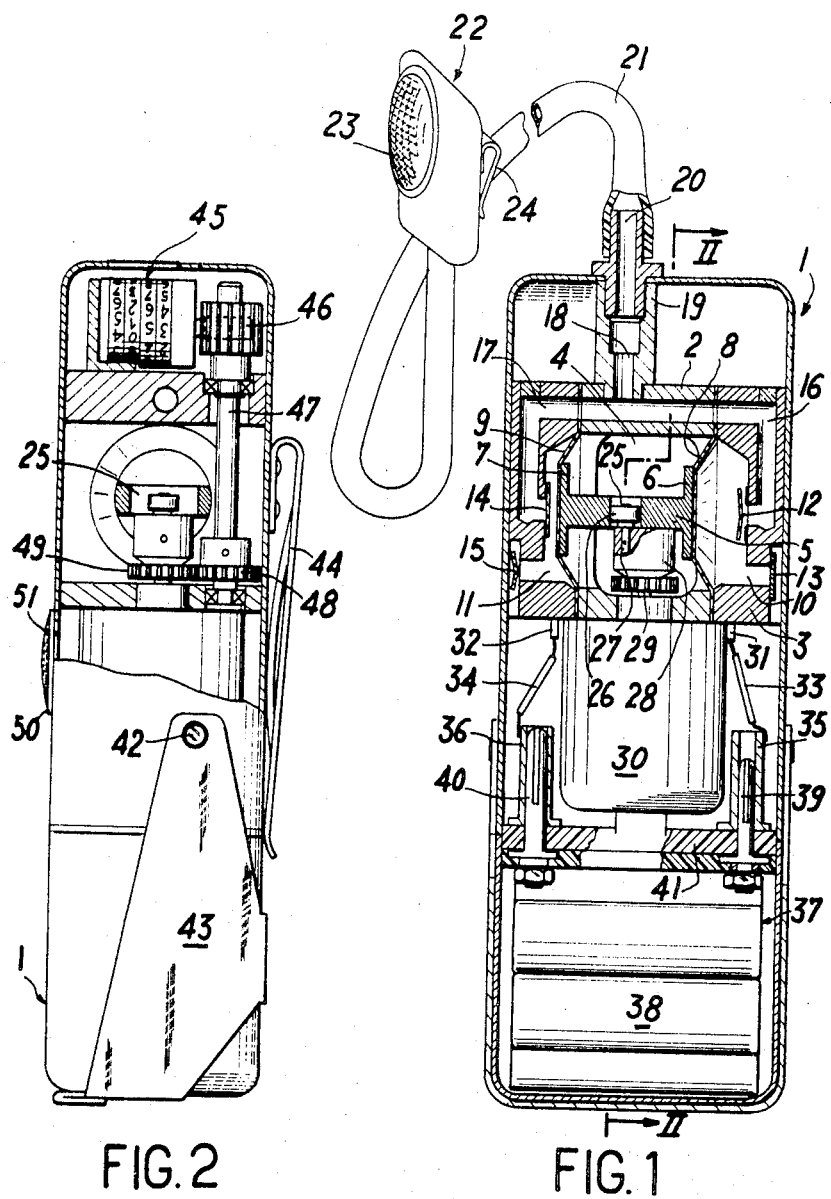
FIG. 1 is a vertical sectional view of an apparatus which is constructed in accordance with the invention.
FIG. 2 shows the same apparatus in partial cross-section along the line II—II of FIG. 1.

From these figures, it is apparent that the apparatus is presented in the form of a metal case 1, inside which are fixed two cross-members 2 and 3, there being formed between said cross-members a space 4 which forms a cylinder and in which is placed a piston 5. Said piston is provided with two end-plates 6 and 7 to which are respectively attached two flexible membranes 8 and 9 of generally circular shape, the ends of which are secured to the members 2 and 3. The piston 5 and the membranes 8 and 9 which are associated therewith thus define between the members 2 and 3 on the one hand and the side wall of the case 1 on the other hand two cavities 10 and 11 which are mounted in opposition and so disposed that, in the case of a displacement of the piston 5 in reciprocating translational motion within the cylinder 4, the volume of the cavity 10 increases when the volume of the cavity 11 decreases, and conversely. Each cavity referred to above is fitted with valves which perform the functions respectively of admission or delivery of the air which is thus drawn into or discharged from said cavities as a result of the displacements of the piston. When the volume of the cavity 10 increases as a result of a displacement of the piston towards the left-hand side of the figure, the admission valve 12 is in the open position whilst the delivery valve 13 is in the closed position. On the contrary, the volume of the cavity 11 decreases during the same displacement towards the left, the admission valve 14 which is located on the inside of said cavity being closed whilst the delivery valve 15 is open. The two admission valves 12 and 14 are connected by means of ducts 16 and 17 formed within the thickness of the member 2 to a common passageway 18 and this latter is adapted to communicate by means of a sleeve 19 with a terminal connector 20 which traverses the top portion of the case 1. A flexible hose 21 formed of rubber or any other suitable flexible material is fitted at one end over said connector. The other end of said flexible hose is connected to a holder 22 designed to carry a filter 23 for the purpose of retaining aerosols and especially radioactive particles or dusts which are present in a contaminated atmosphere. The filter holder 22 is preferably fitted with a clip 24, thereby enabling an operator who is carrying the apparatus to attach the filter to any part of his clothing.

There is formed in the central portion of the piston 5 an opening 25 having a width (as shown in FIG. 1) which is appreciably smaller than its length (as shown in FIG. 2). A roller bearing 26 is mounted within said opening and the inner bearing ring is rigidly fixed to a shaft 27 which is secured to a coupling member 28 for the purpose of coupling the piston 5 to the drive shaft 29 of an electric motor 30 which is fixed inside the case underneath the separating member 3. Said motor 30 is of a conventional D.C. type and has two terminals 31 and 32 for the purpose of connecting said motor by means of electric lead-wires 33 and 34 to two socket connectors 35 and 36 in which are inserted the plugs of a storage battery 37. As an advantageous feature, said battery is made up of a bank of cells 38 which can be recharged from a suitable voltage supply while the apparatus is not in use. The battery 37 is provided with plugs 39 and 40 which are adapted to engage in the above-mentioned socket connectors 35 and 36 and these latter are secured to a plate 41 which is rigidly fixed inside the case.

From FIG. 2, it is further apparent that the bottom section of the case 1 can be withdrawn by causing a yoke 43 to pivot about pins such as the pin 42, thereby releasing said bottom section and gaining access to the battery 37, especially for recharging purposes. A clip 44 is fixed in the central portion of the case 1 so as to enable the user to fasten the apparatus to his belt, for example. In addition, in order to permit continuous control of the quantity of air which is drawn into the apparatus and which has passed through the filter 23 under the foregoing conditions, the apparatus is provided with a counter which indicates the number of revolutions of the motor 30. This revolution counter 45 is driven by a pinion 46 which is keyed to one end of a shaft 47 whilst another pinion 48 is keyed to the other end of said shaft and in turn adapted to engage with a set of teeth 49 which is integral with the drive shaft 29 of the motor. Finally, the indrawn air is discharged from the case through an opening 50 of suitable dimensions which is protected by a grid 51 and formed in the central portion of the case on the side opposite to the clip 44.

The operation of the apparatus for sampling aerosols as contemplated by the invention can readily be deduced from the foregoing description. Thus, a user who is called upon to penetrate into a hazardous area, for example an area which is contaminated by radioactive particles, attaches the apparatus to his belt and starts up the motor 30 by suitably connecting the supply battery 37 which is held in the bottom of the case by the yoke 43.

The displacements of the piston 5 and of the membranes 8 and 9 within the cavities 10 and 11 induce through the filter 23 the suction of a volume of contaminated air which can be determined with precision after calibration of the apparatus, simply by reading the number of revolutions of the motor 30 on the counter 45. Upon subsequent inspection of the filter, it is then possible to determine the quantity of radioactive particles which have been arrested and consequently the quantity inhaled by the user during the time he has remained in the contaminated area.

By way of indication, the apparatus according to the invention has the following dimensions:

|  | Mm. |
|---|---|
| Height of case | 160 |
| Width of case | 55 |
| Thickness of case | 40 |

The motor (power of 1, 2 watts) is supplied at a voltage of 9.6 volts and makes it possible to aspirate approximately 5 liters of air per minute, which represents approximately one quarter of the volume of air actually inhaled by an individual over the same period of time.

What I claim is:
1. An apparatus for sampling aerosols contaminated by radioactive particles, which comprises a closed case connected by means of a pipe to a filter for retaining the radioactive particles, said case having a cylinder which is rigidly fixed therein an electric motor having a shaft and a separate supply battery disposed inside said case, a piston coupled to said motor by means of a transmission unit which converts the movement of rotation of the motor shaft to said reciprocal translational displacement of said piston within a cylinder, two flexible membranes attached to ends of said piston and to end walls of the cylinder so as to form inside said cylinder two cavities each having a volume which varies in inverse ratio upon reciprocation of the piston, a passageway providing a communication between said pipe and said cylinder, valve means in said cylinder for the admission and discharge of contaiminated air into and from each of said cavities and an opening in said case communicating with said cylinder for discharging air from said case.

2. A sampling apparatus in accordance with claim 1, comprising a mechanical counter coupled to the shaft of the motor by means of a gear system provides a continuous indication of the number of revolutions of said motor and consequently of the volume of air which is drawn into the apparatus.

3. A sampling apparatus in accordance with claim 1, wherein the supply battery is constituted by a re-chargeable storage battery placed in the bottom of the case which is provided with a retractable base.

4. A sampling apparatus in accordance with claim 1, comprising means for fastening said apparatus to any part of a user's clothing.

5. An apparatus for sampling aerosols as defined in claim 1, especially for the purpose of measuring atmospheric contamination and determining the absorbed dose of ionizing radiation received by individuals.

References Cited
UNITED STATES PATENTS

| | | | |
|---|---|---|---|
| 978,167 | 12/1910 | Kelsey | 55—467 |
| 1,282,412 | 10/1918 | Granberg | 73—240 |
| 2,877,715 | 3/1959 | Rittenhouse | 103—150 |
| 3,015,281 | 1/1962 | Umholtz | 318—139 |
| 3,056,543 | 10/1962 | Kenrick et al. | 230—170 |
| 3,295,359 | 1/1967 | Peck | 55—270 |

HARRY B. THORNTON, *Primary Examiner.*

BERNARD NOZICK, *Assistant Examiner.*